United States Patent
Gupta et al.

(10) Patent No.: US 10,990,496 B2
(45) Date of Patent: Apr. 27, 2021

(54) SYSTEM AND METHOD TO DERIVE HEALTH INFORMATION FOR A GENERAL PURPOSE PROCESSING UNIT THROUGH AGGREGATION OF BOARD PARAMETERS

(71) Applicant: DELL PRODUCTS, LP, Round Rock, TX (US)

(72) Inventors: Chitrak Gupta, Bangalore (IN); Sreenivasula Reddy G, Cuddapah (IN); John R. Palmer, Georgetown, TX (US); Richard Lynn Hall, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 16/453,025

(22) Filed: Jun. 26, 2019

(65) Prior Publication Data

US 2020/0409813 A1  Dec. 31, 2020

(51) Int. Cl.
*G06F 11/00* (2006.01)
*G06F 11/30* (2006.01)
*G06F 11/07* (2006.01)

(52) U.S. Cl.
CPC ........ *G06F 11/3058* (2013.01); *G06F 11/076* (2013.01); *G06F 11/3055* (2013.01)

(58) Field of Classification Search
CPC ............... G06F 11/3058; G06F 11/076; G06F 11/3055; G06F 11/0703; G06F 11/0706; G06F 11/0721; G06F 11/0724; G06F 11/0751; G06F 11/0754; G06F 16/24569
See application file for complete search history.

(56) References Cited

U.S. PATENT DOCUMENTS

| | | | |
|---|---|---|---|
| 9,860,189 B2 | 1/2018 | Puthillathe | |
| 10,241,879 B2 | 3/2019 | Puthillathe et al. | |
| 10,846,161 B2* | 11/2020 | Ganesan | G06F 11/079 |
| 2016/0110124 A1* | 4/2016 | Camp | G06F 11/076 |
| | | | 714/704 |
| 2017/0262953 A1* | 9/2017 | Ragupathi | G06F 9/5083 |
| 2017/0359275 A1 | 12/2017 | Puthillathe | |
| 2020/0034221 A1* | 1/2020 | Ganesan | G06F 11/0709 |

(Continued)

OTHER PUBLICATIONS

Nie, Bin, Devesh Tiwari, Saurabh Gupta, Evgenia Smimi, and James H. Rogers. "A large-scale study of soft-errors on GPUs in the field." In 2016 IEEE International Symposium on High Performance Computer Architecture (HPCA), pp. 519-530. IEEE, 2016. (Year: 2016).*

*Primary Examiner* — Anthony J Amoroso
(74) *Attorney, Agent, or Firm* — Larson Newman, LLP

(57) ABSTRACT

An information handling system includes a host processing system and a baseboard management controller (BMC). The host processing system includes a main processor that instantiates a management controller agent, and a general-purpose processing unit (GPU). The BMC is coupled to the host processing system and to the GPU. The BMC is configured to direct the management controller agent to retrieve first management information from the GPU, receive the first management information from the management controller agent, retrieve second management information from the GPU, and provide a health indication for the GPU based upon the first management information and the second management information.

18 Claims, 6 Drawing Sheets

(56) References Cited

U.S. PATENT DOCUMENTS

2020/0034268 A1* 1/2020 Ganesan ............. G06F 11/0754
2020/0034269 A1* 1/2020 Ganesan ............. G06F 11/3072
2020/0097055 A1* 3/2020 Wang ..................... G05B 15/02

* cited by examiner

SYSTEM AND METHOD TO DERIVE HEALTH INFORMATION FOR A GENERAL PURPOSE PROCESSING UNIT THROUGH AGGREGATION OF BOARD PARAMETERS

FIELD OF THE DISCLOSURE

This disclosure generally relates to information handling systems, and more particularly relates to deriving health information for a general-purpose processing unit through aggregation of board parameters.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. The use of the same reference symbols in different drawings indicates similar or identical items. Embodiments incorporating teachings of the present disclosure are shown and described with respect to the drawings presented herein, in which.

SUMMARY

An information handling system may include a host processing system and a baseboard management controller (BMC). The host processing system may include a main processor that instantiates a management controller agent, and a general-purpose processing unit (GPU). The BMC may be coupled to the host processing system and to the GPU. The BMC may be configured to direct the management controller agent to retrieve first management information from the GPU, receive the first management information from the management controller agent, retrieve second management information from the GPU, and provide a health indication for the GPU based upon the first management information and the second management information.

DETAILED DESCRIPTION OF DRAWINGS

The following description in combination with the Figures is provided to assist in understanding the teachings disclosed herein, and will focus on specific implementations and embodiments of the teachings. This focus is provided to assist in describing the teachings, and should not be interpreted as limiting the scope or applicability of the teachings. Moreover, other teachings can be used along with the teachings of this disclosure, and the teachings of this disclosure can be used along with other disclosures.

Figure 1:
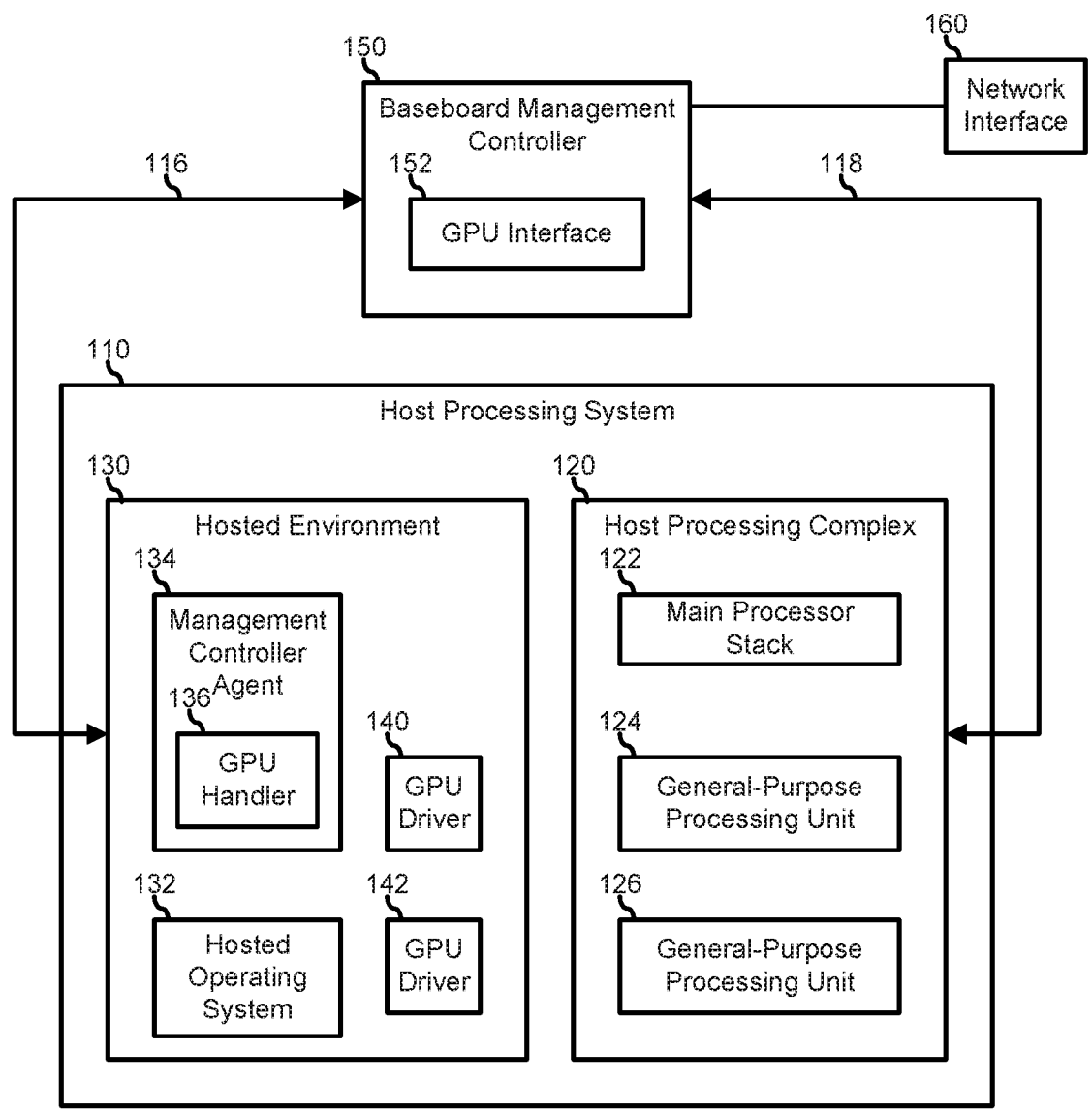
FIG. 1 is a block diagram of an information handling system according to an embodiment of the present disclosure.

FIG. 1 illustrates an information handling system 100 including a host processing system 110, a baseboard management controller (BMC) 150, and a network interface 160. Host processing system 110 includes a host processing complex 120 and a hosted environment 130. Host processing complex 120 represents the main processing elements of information handling system 100, including a main processor stack 122, and general-purpose processing units (GPUs) 124 and 126. Main processor stack 122 represents one or more processors, chipset elements, storage devices, memory devices, I/O devices, and the like. GPUs 124 and 126 represent processing resources of host processing complex 120 that can be utilized to offload main processor stack 122 from various functions as needed or desired. An example of GPUs 124 and 126 include graphics co-processors, encoding co-processors, or media co-processors, and the like, such as various processing devices as my be supplied by different vendors or manufacturers. In a particular embodiment, GPUs 124 and 126 represent a particular architecture that utilizes graphics co-processors to offload various compute intensive tasks and services from main processor stack 122.

Hosted environment 130 includes a hosted OS 132, a BMC agent 134, and GPU drivers 140 and 142. Hosted environment 130 represents a processing environment instantiated on host processing complex 120, and can include a BIOS or UEFI for information handling system 100, other firmware, device drivers, and the like, that establish the core operating code for establishing the hosted environment, and to launch hosted OS 132 on the host processing complex. Hosted OS 132 operates to manage the runtime aspects of hosted environment 130, to launch programs and applications on host processing complex 120, and to launch, manage, maintain, and halt workloads on GPUs 124 and 126. GPU drivers 140 and 142 operate to control GPUs 124 and 126, and to provide an interface to enable hosted OS 132 and other components of hosted environment 130 to access the GPUs. In a particular embodiment, one or more of GPUs 124 and 126 include vendor specific functions and features for configuring, monitoring, and controlling the GPUs. Such vendor specific functions and features are accessible to hosted environment 130 via GPU drivers 140 and 142. In particular, one or more of GPUs 124 and 126 may include monitoring functions and features that relate to the operating conditions experienced by the GPUs in real time. For example, one or more of GPUs 124 and 126 may include monitoring features that provide information to respective GPU drivers 140 and 142 that relates to power utilization, operating temperature, thermal thresholds and threshold events, thermal shutdown events, power brake events, processing core utilization, memory utilization, memory and I/O bandwidth, memory page retirements, or page faults, or other features, as needed or desired. Note that GPU drivers 140 and 142 operate in-band with the operations of hosted environment 130.

BMC 150 is connected via an interface 116 to interact with various functions and features of hosted environment 130, and is connected via an out-of-band interface 118 to interact with various functions and features of host processing complex 120. In particular, BMC 150 interacts with the various functions and features of hosted environment 130 via a management system agent 134 that is instantiated in the hosted environment to permit a user connected to the BMC to obtain status information from the pre-boot and runtime elements of the hosted environment, including the programs and applications instantiated in the hosted environment. The user can also provide commands and otherwise control the operations of the programs and applications, including directing hosted OS 132 to launch a program, application, or workload, to modify the runtime operation of a program, application, or workload, and to halt the execution of a program, application, or workload, as needed or desired. Interface 116 represents a communication path between hosted environment 130 and BMC 150, as is known in the art, and can include a keyboard controller style (KCS) interface, a USB-NIC interface, an OS-to-BMC pass-through interface, or the like.

BMC 150 includes a GPU interface module 152 that interacts with the various in-band functions and features of GPU drivers 140 and 142 via a GPU handler module 136 of management system agent 134 to permit the user to obtain status information from the workloads instantiated on GPUs 124 and 126, and to access the in-band monitoring features of the GPUs. GPU interface module 152, interacting with GPU handler module 136 also permits the user to provide commands and otherwise control the operations of GPUs 124 and 126 or to manage the workloads running on the GPUs, including directing hosted OS 132 to launch a workload, to modify the runtime operation of a workload, and to halt the execution of a workload, as needed or desired.

BMC 150 also interacts out-of-band with the various functions and features of host processing complex 120, and particularly of main processing stack 122. For example, BMC 150 can receive status information from main processor stack 122, such as processor loading information, I/O bandwidth utilization information, memory capacity and utilization information, and the like. BMC 150 also provides commands and otherwise controls the operations of the elements of information handling system 100, such as by changing an operating voltage or an operating frequency of main processor stack 122.

GPU interface module 152 further interacts out-of-band with GPUs 124 and 126. For example, GPU interface module 152 can receive out-of-band status information from GPUs 124 and 126, such as operating temperatures, thermal thresholds and threshold events, thermal shutdown events, power brake events, supply voltage levels, applied clock frequencies, cooling fan speeds, and the like. GPU interface module 152 can receive other status information from GPUs 124 and 126, including power utilization, operating temperature, processing core utilization, memory utilization, memory and I/O bandwidth, memory page retirements, or other features, and the like. Note that the status information that is available from GPUs 124 and 126 via out-of-band interface 118 may be the same as, or different from the status information that is available from GPU drivers 140 and 142, as may be determined by the particular GPU vendor, or as otherwise dictated by design related choices, as needed or desired. GPU interface module 152 also provides commands and otherwise controls the operations of GPUs 124 and 126, such as by changing an operating voltage or an operating frequency of one or more of the GPUs. In addition, GPU interface module 152 operates to throttle the operation of one or more of GPUs 124 and 126.

GPU interface module 152 provides a management interface that permits a user that is connected to BMC 150 via network interface 160 to select one or more of GPUs 124 and 126, and to view the current operating status of the selected GPU, such as by identifying the workload currently being run on the selected GPU, presenting the current processing load condition, I/O bandwidth, memory usage, or the like, or by otherwise displaying information related to the status of the selected GPU. Here, GPU interface module 152 directs GPU handler module 136 to retrieve the requested information from hosted environment 130, from hosted OS 132, or directly retrieves the requested information from the selected one of GPUs 124 and 126 via out-of-band interface 118. GPU interface module 152 then provides the retrieved information to the user.

The management interface provided by GPU interface module 152 further permits the user to obtain real time in-band status information from GPU handler module 136. Then GPU interface module 152 operates to compare the status information for GPU 124 with the status information for GPU 126. In a particular embodiment, GPU interface module 152 includes vendor supplied information for GPUs 124 and 126 that is related to the status information, such as maximum temperature ratings, peak I/O and memory bandwidths, optimum memory and processor utilization levels, and the like. Here, GPU interface module 152 can provide the current status information to the user as proportions or percentages of the associated vendor supplied limits. Moreover, by displaying the current utilization for both of GPUs 124 and 126, for example, in a side-by-side fashion, the user can easily see the relative loading for each GPU. Similar comparisons can be made for other status metrics, such as operating temperature, memory utilization, memory and I/O bandwidth, and the like. Moreover, comparisons can be made using a first metric for GPU 124 and a different metric for GPU 126. For example, a side-by-side comparison can be made of the current GPU loading for GPU 124 versus the current power consumption for GPU 126. Utilizing the comparison information, a user can optimize schemes for executing various workloads on GPUs 124 and 126. For example, a user can access the management interface provided by GPU interface module 152 to direct GPU handler module 136 to launch a particular workload on both of GPUs 124 and 126, and compare the operational efficiency of the workloads on the different GPUs.

GPUs are increasingly being utilized as high performance co-processors in various server applications. Here a typical server my employ multiple GPUs in a server. For example, a server may be configured with eight or more GPUs to offload various workloads from the processor stack. As such, the reliability and maintainability of GPUs becomes a critical factor in the overall reliability and maintainability of the server system. However, because many commonly available GPUs utilized in server systems derive from graphics accelerators for high-performance workstation and gaming systems, and therefore are not configured with robust error detection and health monitoring features as may be expected of server systems. In particular, while specific failure may be detectible by the GPUs, the types of health tracking and forecasting information typically demanded of server equipment is not typically supported on many commonly available GPUs. Moreover, even when failure information is provided, the failures are typically identified by logical GPU number, and the failures are not correlated to a physical slot in the server system, so as to enable a support technician to identify a failing GPU and replace it.

Figure 2:
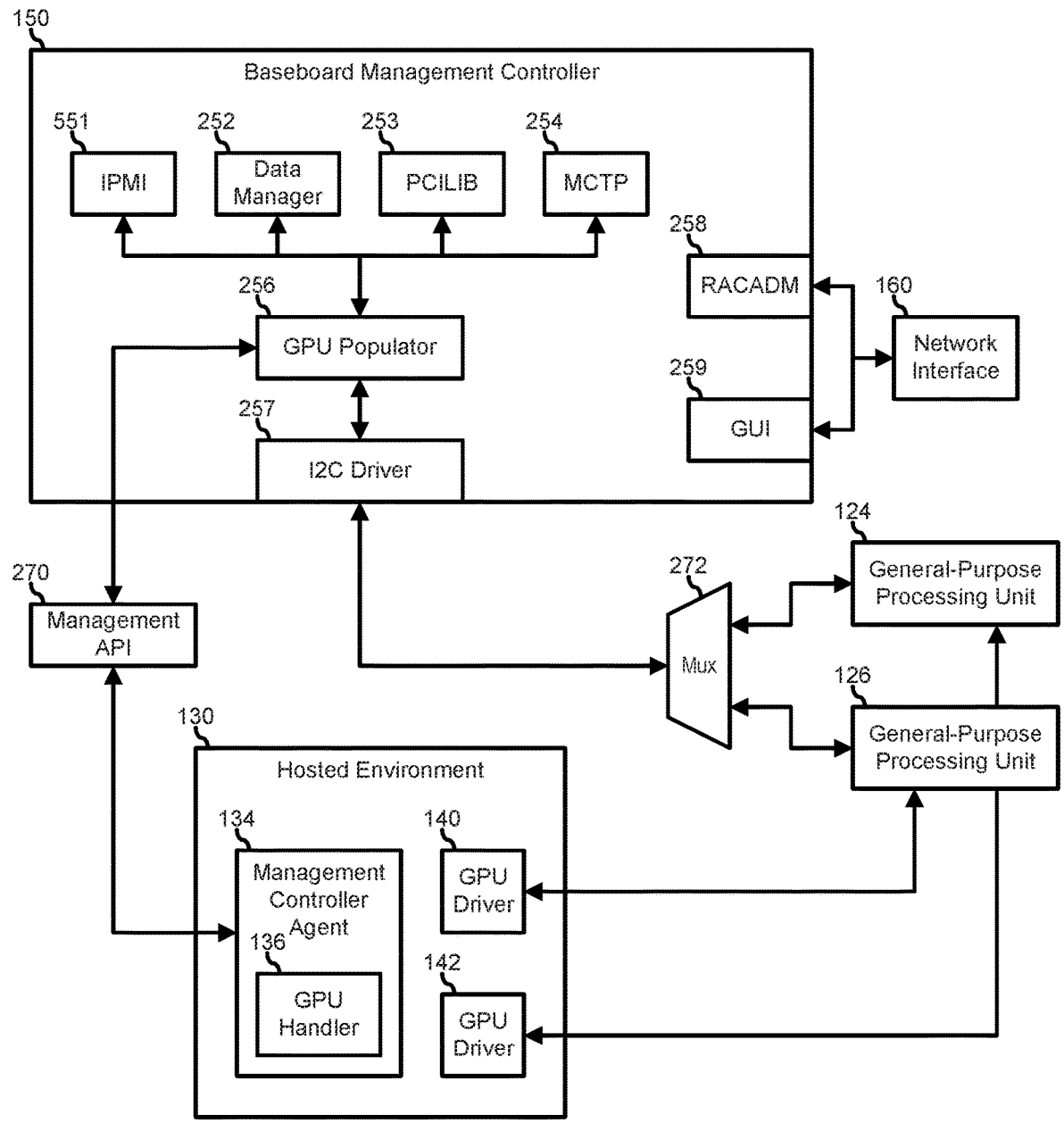
FIG. 2 is a block diagram detailing application and software level components of the information handling system of FIG. 1.

FIG. 2 illustrates information handling system 100, with emphasis on software and application level components for deriving health information for GPUs through aggregation of board parameters. Here, information handling system 100 is illustrated as including hosted environment 130, GPUs 124 and 126, BMC 150, network interface 160, a manageability application program interface (API) 270 and an Inter-Integrated Circuit (I²C) multiplexor 272. Hosted environment 130 includes management controller agent 134 and GPU drivers 140 and 142. Management controller agent 134 includes GPU handler 136. BMC 150 includes an Intelligent Platform Management Interface (IPMI) module 251, a Universal Database (UDB) module 252, a PCI-library (PCILIB) module 253, a Management Component Transport Protocol (MCTP) module 254, a GPU populator 255, an I²C driver 256, a Remote Access Control Administrator (RACADM) 257, and a graphical user interface 258.

As noted above, GPU drivers 140 and 142 operate to control GPUs 124 and 126, and to provide an interface to enable hosted OS 132 and other components of hosted environment 130 to access vendor specific functions and features for configuring, monitoring, and controlling the GPUs, including monitoring functions and features that relate to power utilization, operating temperature, thermal thresholds and threshold events, thermal shutdown events, power brake events, processing core utilization, memory utilization, memory and I/O bandwidth, memory page retirements or page faults, or other features, as needed or desired. Here, GPU drivers 140 and 142 operate in-band with the operations of hosted environment 130, for example via PCIe interfaces to GPUs 124 and 126.

BMC 150 is connected via manageability API 270 to interact with various functions and features of hosted environment 130. In particular, manageability API 270 interacts with the various functions and features of hosted environment 130 via management system agent 134. As such, manageability API 270 represents a standards-based communication API that provide a uniform set functions and features for the management of a hosted environment by a BMC 150. An example of manageability API 270 includes a Redfish API in accordance with a Redfish Standard published by the Distributed Management Task Force (DMTF), or another API configured to manage communications between a hosted environment and a BMC. In a particular embodiment, BMC 150 operates via manageability API 270 to access the various in-band functions and features of GPU drivers 140 and 142 via GPU handler module 136 to permit the user to access the in-band monitoring features of the GPUs, as described above.

BMC 150 is connected via I²C driver 256 to I²C multiplexor 272 to interact out-of-band with GPUs 124 and 126. For example, BMC 150 can receive out-of-band status information from GPUs 124 and 126, such as operating temperatures, supply voltage levels, applied clock frequencies, cooling fan speeds, and the like, for example via an I²C interface provided on the GPUs. BMC 150 can receive other status information from GPUs 124 and 126, including power utilization, operating temperature, processing core utilization, memory utilization, memory and I/O bandwidth, or other features, and the like. For example, where one or more of GPUs 124 and 126 represent a GPU manufactured by NVIDIA Corporation, BMC 150 may utilize a SMBus Post Box Interface (SMBPBI) to communicate with the GPU. In other examples, where one or more of GPUs 124 and 126 represent a GPU from another manufacturer, BMC 150 may utilize another mechanism for communication with the GPU.

In a particular embodiment, GPU populator 255 operates to aggregate the management information from the in-band communication with GPUs 124 and 126 via manageability API 270, and from the out-of-band communication with the GPUs via I²C driver 256. In collecting the management information, GPU populator 255 calls on processes, function calls, standards-based procedures, and the like, supplied by IPMI module 251, UDB module 252, PCILIB 253, and MCTP module 254. The details of utilizing the processes, function calls, procedures, and the like, from IPMI module 251, UDB module 252, PCILIB 253, and MCTP module 254 are known in the art and will not be further disclosed herein, except as needed to illustrate the embodiments disclosed herein. GPU populator 255 further integrates the management information from GPUs 124 and 126 to provide slot-based GPU health status information, slot-based GPU communication status, GPU subsystem health information, and the like.

Figure 3:
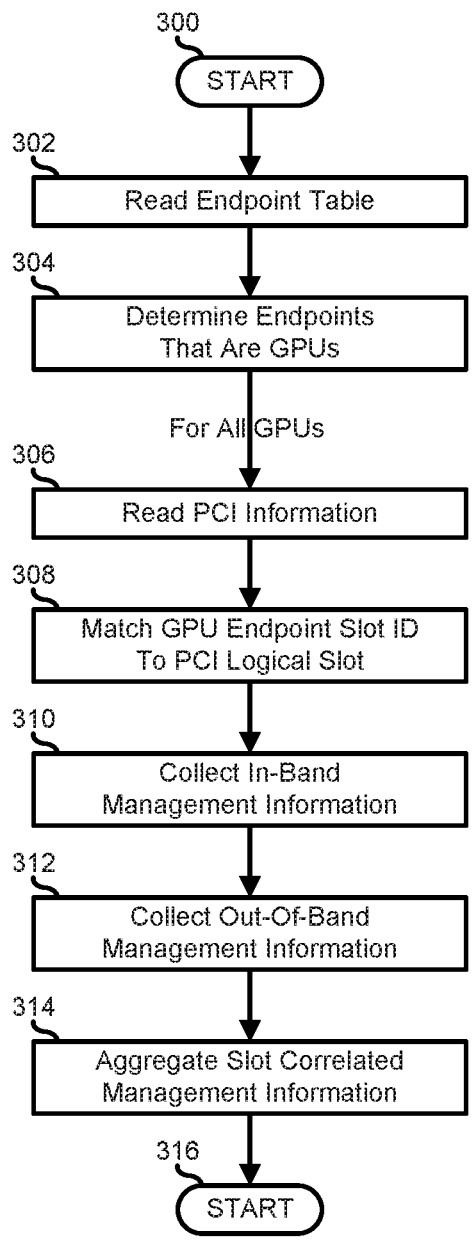
FIG. 3 is a flowchart illustrating a method for extracting management information from GPUs in an information handling system according to an embodiment of the present disclosure.

FIG. 3 illustrates a method for extracting management information from GPUs in an information handling system, starting at block 300. In block 302 a BMC reads an endpoint table to determine the PCI endpoints in an information handling system and caches the endpoint information in a global variable list. For example, a GPU populator implemented on a BMC may utilize an MCTP module to access and MCTP endpoint table. In block 304, the BMC evaluates the endpoint table entries to determine which endpoints are related to a GPU. For example, where a GPU in the information handling system is an NVIDIA GPU, the GPU populator can determine that a "sensor_sa" value in the endpoint table is 0x5C, identifying the endpoint as an NVIDIA GPU. At this point in the method, the GPUs in the information handling system are identified.

Blocks 306-314 are then performed for each GPU in the information handling system. In block 306, the BMC determines the PCI configuration information to determine the logical identities of the GPUs. For example, the GPU populator can access a PCILIB API to obtain the sPCIData information from the PCI tables of the information handling system. In block 308, the BMC matches the GPU endpoint identification information with the PCI logical slot information from the PCI tables. For example, the GPU populator can match the I²C slave address for each GPU with the PCI table information. At this point in the method, each GPU is correlated by associating the logical PCI slot information with the physical location via the I²C slave address.

In block 310, the in-band management information from the GPUs is collected by the BMC. For example, the GPU populator can invoke a management API to access the GPU drivers to issue commands to retrieve the in-band management information from the GPUs. In block 312, the BMC collects the out-of-band management information from the GPUs. For example, the GPU populator can send I²C commands in sequence to the GPUs by using the slave addresses and SMBPBI I²C commands to collect the required GPU information. At this point in the method, the management information for the GPUs in the information handling system is collected by the BMC. In block 314, the BMC aggregates the management information to provide correlated health information for each GPU and for the GPU subsystem of the information handling system, and the method ends in block 316.

Figure 4:
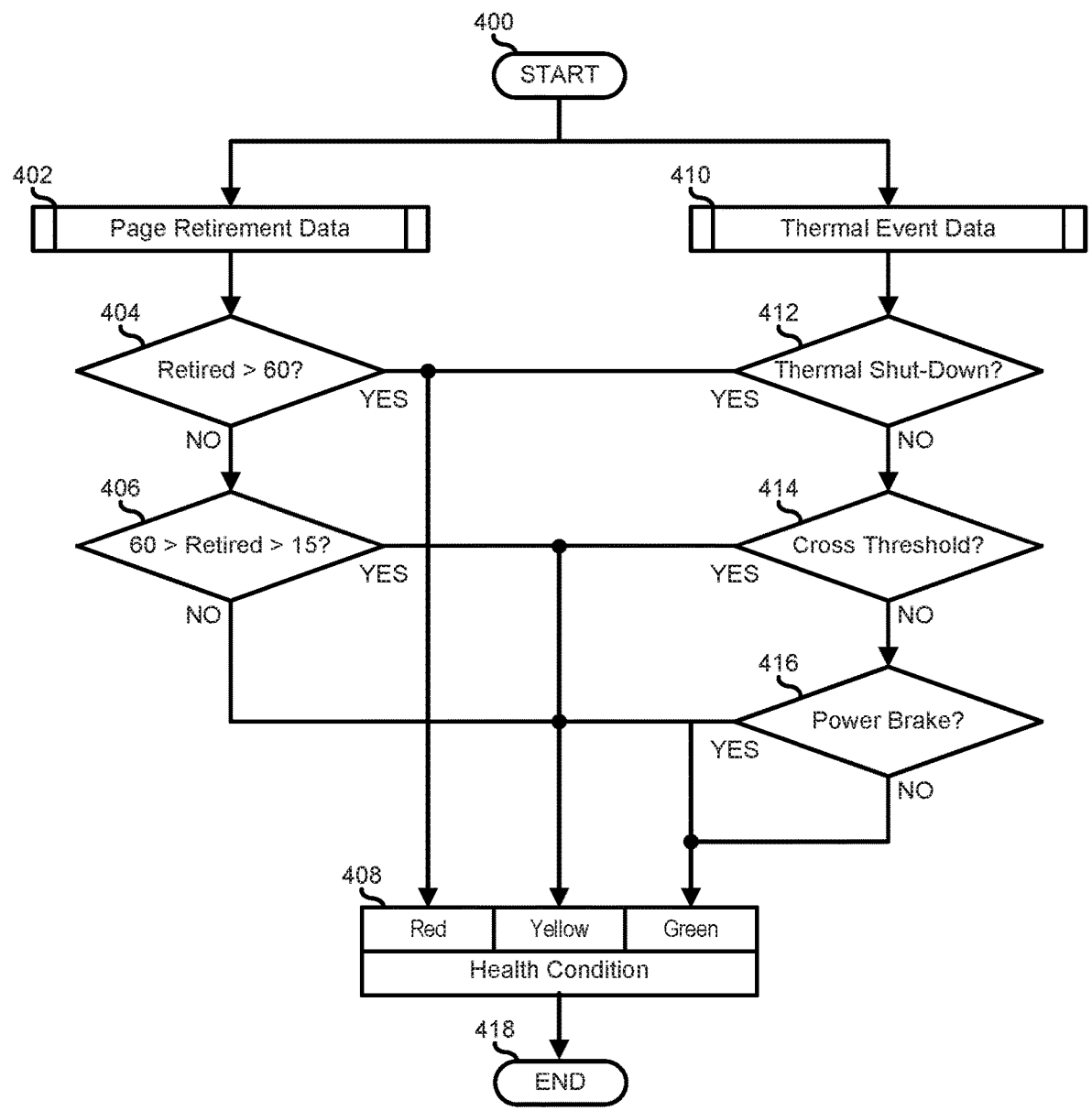
FIG. 4 is a flowchart illustrating a method of calculating the health of a GPU in an information handling system according to an embodiment of the present disclosure.

FIG. 4 illustrates a method of calculating the health of a GPU starting at block 400. A number of page retirements performed by the GPU is accessed in block 402. For example, the number of page retirements performed by a GPU may be determined based upon the method shown in FIG. 3. In particular, where a GPU represents a Nvidia GPU, a GPU driver may retire a page once it has experienced one double-bit ECC error (DBE) or two single-bit ECC errors (SBE) at the same memory address. The number of retired pages is compared to a high threshold in decision block 404. For example, the high page retirement threshold can be equal to 60. Here, a number of page retirements greater than 60 can indicate a failing GPU. If the number of retired pages is greater than the high threshold, the "YES" branch of decision block 404 is taken, a health condition for the GPU is set to red in block 408, and the method ends in block 418. If the number of retired pages is less than the high threshold, the "NO" branch of decision block 404 is taken and the number of page retirements performed by the GPU is compared to a low threshold in decision block 406. For example, the low page retirement threshold can be equal to 15. Here, a number of page retirements greater than 15 but less than 60 can indicate a GPU that is in danger of failing. If the number of retired pages is greater than the low threshold but less than the high threshold, the "YES" branch of decision block 404 is taken, the health condition for the GPU is set to yellow in block 408, and the method ends in block 418. If the number of retired pages is less than the low threshold, the "NO" branch of decision block 406 is taken, the health condition for the GPU is set to green in block 408 and the method ends in block 418.

Data related to thermal events experienced by the GPU is accessed in block 410. For example, the thermal events experienced by a GPU may be determined based upon the method shown in FIG. 3. A decision is made as to whether or not the GPU has experienced a thermal shut-down event in decision block 412. If so, the "YES" branch of decision block 412 is taken, a health condition for the GPU is set to red in block 408, and the method ends in block 418. If the GPU has not experienced a thermal shut-down event, the "NO" branch of decision block 412 is taken and a decision is made as to whether or not the GPU has experienced a thermal event that crossed a thermal threshold for the GPU in decision block 414. If so, the "YES" branch of decision block 414 is taken, the health condition for the GPU is set to yellow in block 408, and the method ends in block 418. If the GPU has not experienced a thermal event that crossed a thermal threshold for the GPU, the "NO" branch of decision block 414 is taken and a decision is made as to whether or not the GPU has issued a system power brake signal in decision block 416. If so, the "YES" branch of decision block 416 is taken, the health condition for the GPU is set to yellow in block 408, and the method ends in block 418. If the GPU has not issued a system power brake signal, the "NO" branch of decision block 416 is taken, the health condition for the GPU is set to green in block 408 and the method ends in block 418.

In a particular embodiment, in addition to providing a health indication for each GPU, a BMC provides a GPU subsystem health indication. Here, the GPU subsystem health represents an aggregated health indicator of all of the GPUs in an information handling system.

Figure 5:
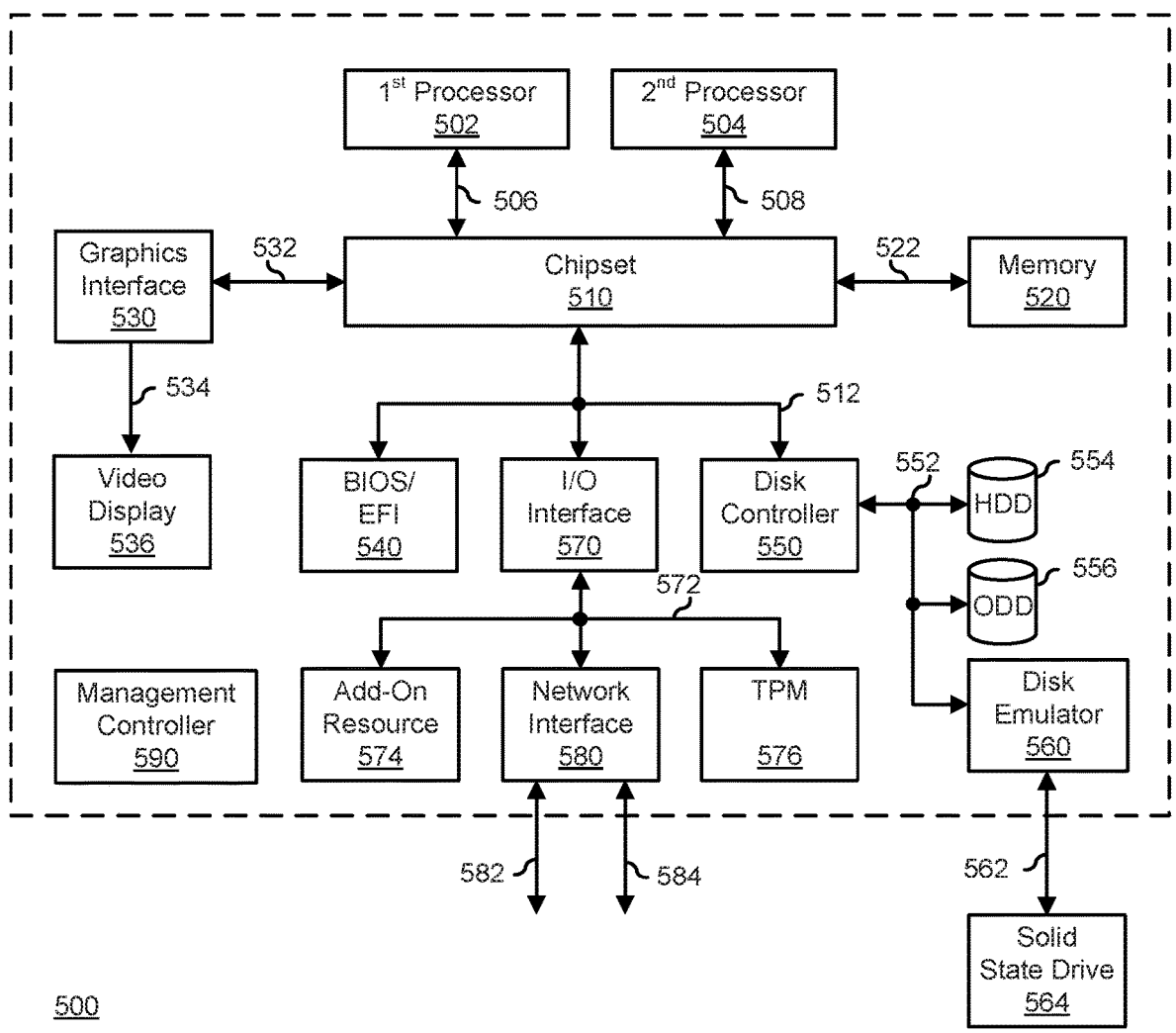
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, a basic input and output system/extensible firmware interface (BIOS/EFI) module 540, a disk controller 550, a disk emulator 560, an input/output (I/O) interface 570, a network interface 580, and a BMC 590. Processor 502 is connected to chipset 510 via processor interface 506, and processor 504 is connected to the chipset via processor interface 508. Memory 520 is connected to chipset 510 via a memory bus 522. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof. Graphics interface 530 is connected to chipset 510 via a graphics interface 532, and provides a video display output 534 to a video display 536.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a trusted platform module (TPM) 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof. TPM 576 can include a dedicated crypto-processor and secure storage, to ensure the integrity of information handling system 500 and to detect and prevent tampering with the operating firmware of the information handling system.

Network interface 580 represents a NIC disposed within information handling system 500, on a main circuit board of the information handling system, integrated onto another component such as chipset 510, in another suitable location, or a combination thereof. Network interface 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

BMC 590 provides for out-of-band monitoring, management, and control of the respective components of information handling system 500, such as cooling fan speed control, power supply management, hot-swap and hot-plug management, firmware management and update management for system BIOS or UEFI, Option ROM, device firmware, and the like, or other system management and control functions as needed or desired. As such, management system 590 provides some or all of the functions and features of the management systems described herein.

Figure 6:
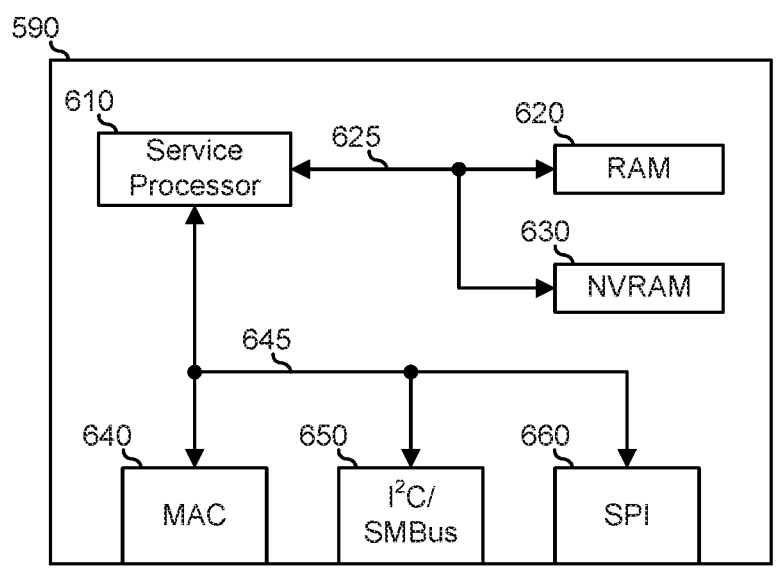
FIG. 6 is a block diagram illustrating an embodiment of a management system of the information handling system of FIG. 5.

FIG. 6 illustrates an embodiment of management system 590, including a service processor 610, a random-access memory (RAM) 620, an NVRAM 630, a media access control interface (MAC) 640, an I²C/SMBus interface 650, and an SPI interface 660. RAM 620 and NVRAM 630 are connected to service processor 610 through a memory bus 625. MAC 640, I²C/SMBus interface 650, and SPI interface 660 are connected to service processor 610 through an I/O bus 645. Management system 590 functions as a separate microcontroller system in information handling system 500, providing a dedicated management channel for maintenance and control of resources in the information handling system. As such, the resources in information handling system 500 are connected to one or more of I²C/SMBus interface 650, and SPI interface 660, permitting management system 590 to receive information from or send information to the resources. A management system can be connected to management system 590 via MAC 640, thereby permitting the management system to receive information from or send information to the management system for out-of-band management of information handling system 500. An example of MAC 640 includes an Ethernet standard interface, such as a reduced media independent interface (RMII), a network communication service interface (NCSI), another network standard interface, or any combination thereof.

In a particular embodiment, management system 590 is included on a main circuit board (such as a baseboard, a motherboard, or any combination thereof) of information handling system 500, integrated onto another element of the information handling system such as chipset 510, or another suitable element, as needed or desired. As such, management system 590 can be part of an integrated circuit or a chip set within information handling system 500. An example of management system 590 includes a baseboard management controller (BMC), an integrated Dell remote access controller (iDRAC), another controller, or any combination thereof. Management system 590 can also operate on a separate power plane from other resources in information handling system 500. Thus management system 590 can communicate with a management system while the resources of information handling system 500 are powered off. Here, information can be sent from the management system to management system 590 and the information is stored in RAM 620 or NVRAM 630. Information stored in RAM 620 may be lost after power-down of the power plane for management system 590, while information stored in NVRAM 630 may be saved through a power-down/power-up cycle of the power plane for the micro controller.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a host processing system including:
      a main processor that instantiates a management controller agent; and
      a general-purpose processing unit (GPU); and
   a baseboard management controller (BMC) coupled to the host processing system and to the GPU, the BMC configured to:
      direct the management controller agent to retrieve first management information from the GPU;
      receive the first management information from the management controller agent;
      retrieve second management information from the GPU; and
      provide a health indication for the GPU based upon the first management information and the second management information, wherein at least one of the first and second management information includes a page retirement count for the GPU.

2. The information handling system of claim 1, wherein the health indication includes:
   a first state indicating that the GPU has failed;
   a second state indicating that the GPU is in danger of failing; and
   a third state indicating that the GPU is healthy.

3. The information handling system of claim 2, wherein:
   when the page retirement count is greater than a first threshold, the health indication is in the first state;
   when the page retirement count is greater than a second threshold but less than the first threshold, the health indication is in the second state; and
   when the page retirement count is less than the second threshold, the health indication is in the third state, wherein the second threshold is less than the first threshold.

4. The information handling system of claim 2, wherein at least one of the first and second management information includes:
   a first status indicating that the GPU has experienced a thermal shut-down event;
   a second status indicating that a temperature of the GPU has crossed a thermal threshold; and
   a third status indicating that the GPU has issued a system power brake signal.

5. The information handling system of claim 4, wherein:
   when the GPU has experienced the thermal shut-down event, the health indication is in the first state; and
   when a temperature of the GPU has crossed a thermal threshold or when the GPU has issued a system power brake signal, the health indication is in the second state.

6. The information handling system of claim 1, wherein:
   the GPU is coupled to the main processor via a first interface;
   the BMC is coupled to the host processing system via a second interface; and
   the BMC is coupled to the GPU via a third interface.

7. The information handling system of claim 6, wherein:
   the BMC directs the management controller agent to retrieve the first management information and receives the first management information from the management controller agent via the second interface;
   the management controller agent retrieves the first management information from the GPU via the first interface; and
   the BMC retrieves the second management information via the third interface.

8. The information handling system of claim 6, wherein the first interface includes a Peripheral Component Interconnect-Express (PCIe) interface, the second interface includes one of a keyboard controller style (KCS) interface, a USB-NIC interface, and an OS-to-BMC pass-through interface, and the third interface includes an Inter-Integrated Circuit ($I^2C$) interface.

9. A method, comprising:
   instantiating, by a main processor or an information handling system, a management controller agent to communicate with a baseboard management controller (BMC) of the information handling system;
   directing, by the BMC, the management controller agent to retrieve first management information from the GPU;
   receiving, by the BMC, the first management information from the management controller agent;
   retrieving, by the BMC, second management information directly from the GPU; and
   providing a health indication for the GPU based upon the first management information and the second management information, wherein at least one of the first and second management information includes a page retirement count for the GPU.

10. The method of claim 9, wherein the health indication includes:
a first state indicating that the GPU has failed;
a second state indicating that the GPU is in danger of failing; and
a third state indicating that the GPU is healthy.

11. The method of claim 10, wherein:
when the page retirement count is greater than a first threshold, the health indication is in the first state;
when the page retirement count is greater than a second threshold but less than the first threshold, the health indication is in the second state; and
when the page retirement count is less than the second threshold, the health indication is in the third state, wherein the second threshold is less than the first threshold.

12. The method of claim 10, wherein at least one of the first and second management information includes:
a first status indicating that the GPU has experienced a thermal shut-down event;
a second status indicating that a temperature of the GPU has crossed a thermal threshold; and
a third status indicating that the GPU has issued a system power brake signal.

13. The method of claim 12, wherein:
when the GPU has experienced the a thermal shut-down event, the health indication is in the first state; and
when a temperature of the GPU has crossed a thermal threshold or when the GPU has issued a system power brake signal, the health indication is in the second state.

14. The method of claim 9, wherein:
the GPU is coupled to the main processor via a first interface;
the BMC is coupled to the host processing system via a second interface; and
the BMC is coupled to the GPU via a third interface.

15. The method of claim 14, wherein:
the BMC directs the management controller agent to retrieve the first management information and receives the first management information from the management controller agent via the second interface;
the management controller agent retrieves the first management information from the GPU via the first interface; and
the BMC retrieves the second management information via the third interface.

16. The method of claim 14, wherein the first interface includes a Peripheral Component Interconnect-Express (PCIe) interface, the second interface includes one of a keyboard controller style (KCS) interface, a USB-NIC interface, and an OS-to-BMC pass-through interface, and the third interface includes an Inter-Integrated Circuit ($I^2C$) interface.

17. An information handling system, comprising:
a host processing system including:
a main processor that instantiates a management controller agent;
a first general-purpose processing unit (GPU); and
a second GPU; and
a baseboard management controller (BMC) coupled to the host processing system and to the first and second GPUs, the BMC configured to:
direct the management controller agent to retrieve first management information from the first GPU and to retrieve second management information from the second GPU;
retrieve third management information directly from the first GPU;
retrieve fourth management information directly from the second GPU; and
provide a health indication for the first and second GPUs based upon the first, second, third, and fourth management information, wherein at least one of the first, second, third, and fourth management information includes a page retirement count for the GPU.

18. The information handling system of claim 17, wherein:
the first GPU is coupled to the main processor via a first interface;
the second GPU is coupled to the main processor via a second interface;
the BMC is coupled to the host processing system via a third interface; and
the BMC is coupled to the first and second GPUs via a fourth interface.

* * * * *